No. 747,781. PATENTED DEC. 22, 1903.
A. SCHUSTER.
MATCH BOX FILLING MACHINE.
APPLICATION FILED DEC. 9, 1902.
NO MODEL. 9 SHEETS—SHEET 1.

Fig. 1.

Witnesses
Frank S. Ober
Waldo M. Chapin

Inventor
Albert Schuster
by Wm. A. Rosenbaum
atty.

Fig. 2.

No. 747,781. PATENTED DEC. 22, 1903.
A. SCHUSTER.
MATCH BOX FILLING MACHINE.
APPLICATION FILED DEC. 9, 1902.
NO MODEL. 9 SHEETS—SHEET 3.

Fig. 3.

Witnesses:
Frank A. Ober
Waldo M. Chapin

Inventor
Albert Schuster
by Wm. A. Rosenbaum
atty.

No. 747,781. PATENTED DEC. 22, 1903.
A. SCHUSTER.
MATCH BOX FILLING MACHINE.
APPLICATION FILED DEC. 9, 1902.
NO MODEL. 9 SHEETS—SHEET 4.

Witnesses: Inventor
Frank S. Ober Albert Schuster
Waldo M. Chapin by W. A. Rosenbaum
Atty.

No. 747,781. PATENTED DEC. 22, 1903.
A. SCHUSTER.
MATCH BOX FILLING MACHINE.
APPLICATION FILED DEC. 9, 1902.
NO MODEL. 9 SHEETS—SHEET 7.

Fig. 8.

Witnesses:
Frank A. Ober
Waldo M. Chapin

Inventor
Albert Schuster
by Wm A Rosenbaum
atty

No. 747,781. PATENTED DEC. 22, 1903.
A. SCHUSTER.
MATCH BOX FILLING MACHINE.
APPLICATION FILED DEC. 9, 1902.
NO MODEL. 9 SHEETS—SHEET 8.

Witnesses:
Frank D. Ober
Waldo M. Chapin

Inventor
Albert Schuster
by Wm. J. Rosenbaum
atty

No. 747,781. Patented December 22, 1903.

UNITED STATES PATENT OFFICE.

ALBERT SCHUSTER, OF TEGEL, NEAR BERLIN, GERMANY.

MATCH-BOX-FILLING MACHINE.

SPECIFICATION forming part of Letters Patent No. 747,781, dated December 22, 1903.

Application filed December 9, 1902. Serial No. 134,471. (No model.)

*To all whom it may concern:*

Be it known that I, ALBERT SCHUSTER, a subject of the German Emperor, residing at Tegel, near Berlin, Germany, have invented certain new and useful Improvements in Match-Box-Filling Machines, of which the following is a specification.

This invention relates to a machine for filling the trays or drawers of match-boxes; and the essential feature of the machine in which the trays are fed forward intermittently by an endless apron resides in the fact that matches delivered into cases from a hopper are separated into layers by horizontally-sliding blades, whereupon the match-carrier is lowered to the level of doors, hereinafter referred to, and the matches brought forward by horizontally-acting piston-like slides, so as on suddenly opening the doors to pass into the match-box trays, in which they are pressed by pressing apparatus and shaken by drum mechanism actuated vertically from beneath, so that the matches are uniformly distributed in the boxes. During the filling operation the trays are in a channel provided with recessed or flanged edges overlapping the ends of the trays, while the doors to a certain extent keep the sides apart, so that the matches enter the interior of the boxes without fail. On introducing the boxes into the channel aforesaid a roller device is employed for regulating their position and which brings the boxes to rest against the rear wall of the channel and sets straight boxes inclined to the straight line of travel. Of great importance is the arrangement of a vibrating grate under the hopper, on which the splints lie with their tipped ends to the front, so that matches in a cross position cannot pass to the box-filler, but fall through cross-slots in the grate and its support-plate into special collectors. Interruptions in the operation of the machine, as well as breakage of matches in the match-boxes, are hereby avoided.

The improved device comprises, first, the hopper and vibrating grate; second, receiving-boxes of any number placed beneath the above and alongside one another; third, a door-frame with bipartite doors whose number corresponds to that of the said receiving-boxes, and under the doors lie the match-box trays to be filled; fourth, pressure-hammers with levers closing against the upper edges of the boxes and preventing matches from falling out of the same, so long as, fifth, the drum mechanism arranged beneath the conveying-apron is in operation and effects the shaking of the matches in the boxes.

In the accompanying drawings, which illustrate my invention, Fig. 7 is a section on the line $e\,f$.

Figure 1:
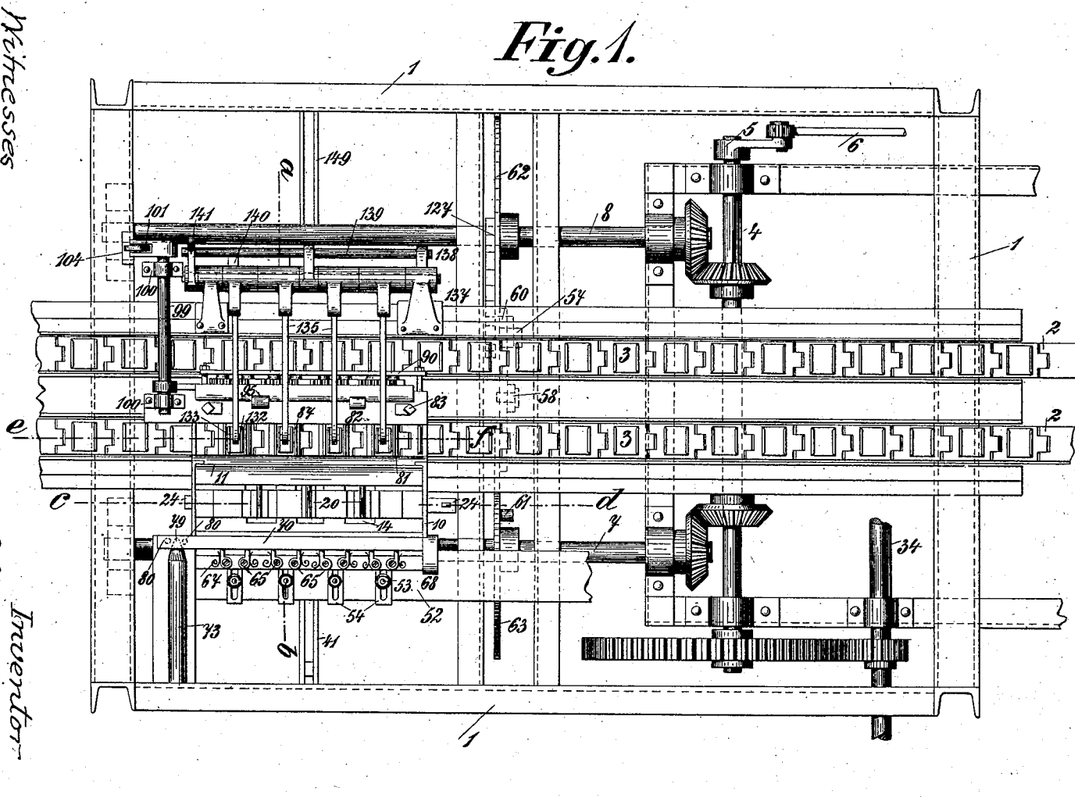
Figure 1 is a plan of the complete machine.

The foundation of the machine consists of the iron bed 1 of U shape. Over two pairs of disks (not shown in the drawings) mounted at the ends of the machine are guided two parallel endless chain bands 2, connected in hinge fashion, and on the upper face are provided at even distances apart clips 3 as carriers for the match-box trays and match-box shucks or covers being conveyed. As shown in Fig. 1, the upper band 2 is intended for carrying the box-shucks, the lower band 2 for the trays. These bands are driven intermittently from the main shaft 4, on which is mounted the eccentric 5, which eccentric drives the axis of the chain-carrying disks (not shown) by means of the connecting-rod 6 and by the action of a pawl on a spur-wheel having four teeth on the axis of the said disks. The other devices are driven from the main shaft 4 by means of bevel-gearing on the shafts 7 and 8, provided with suitably-formed cam-disks.

Figure 2:
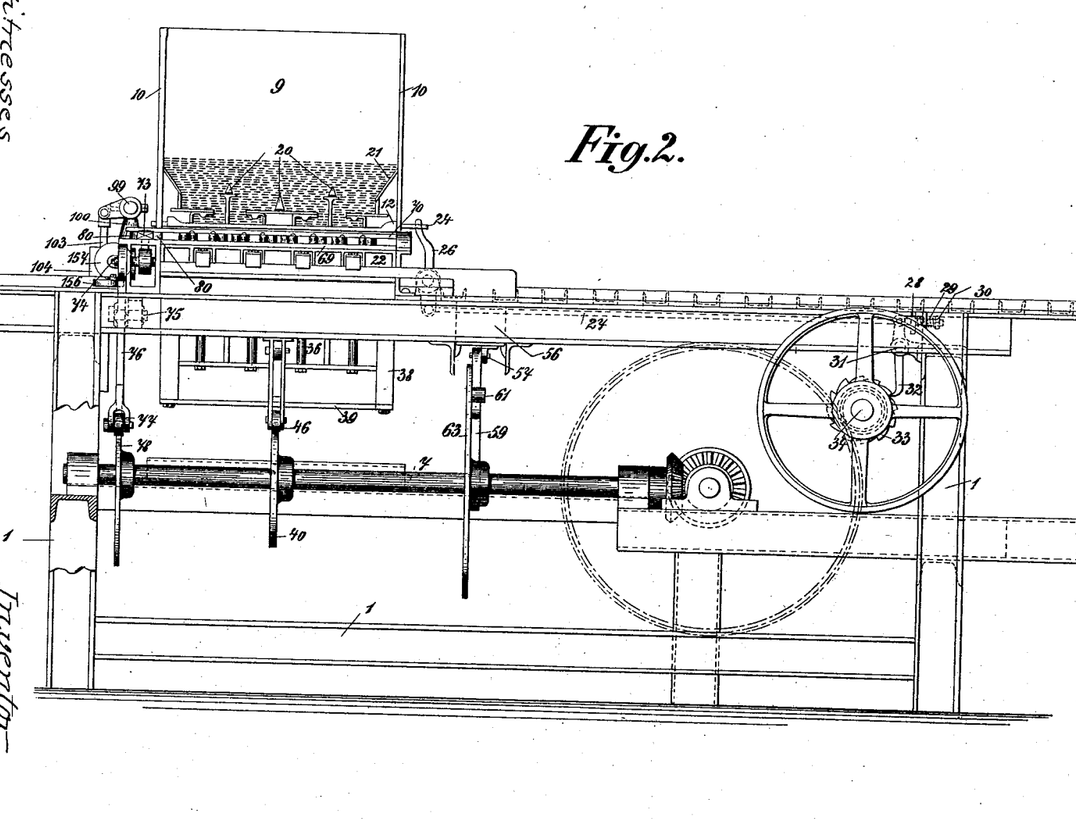
Fig. 2, a front elevation, and Fig. 3 a side elevation, of the same.
Figure 3:
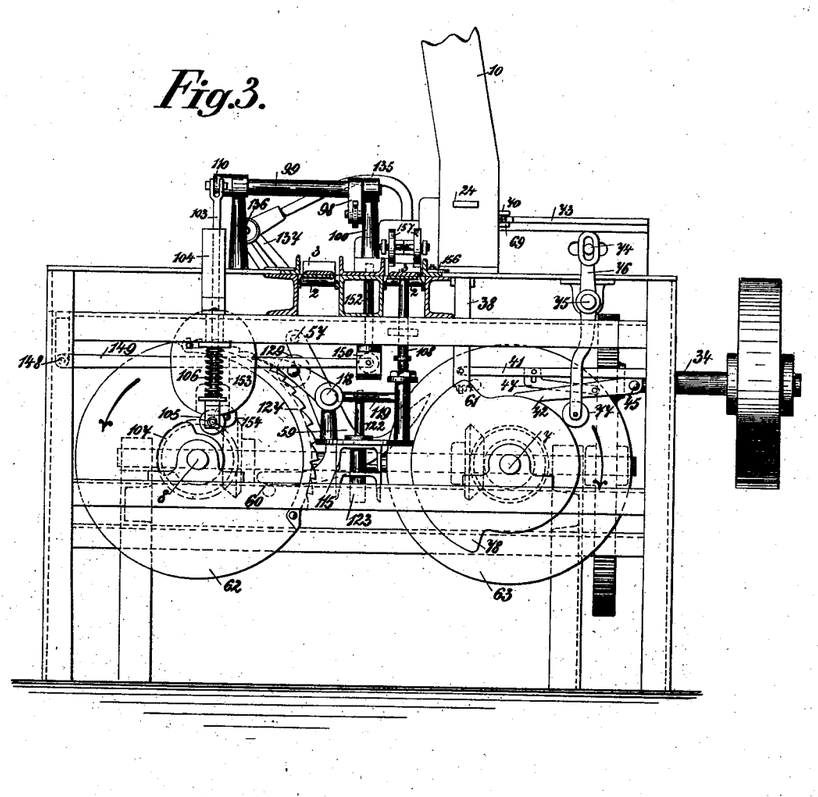
Figure 4:
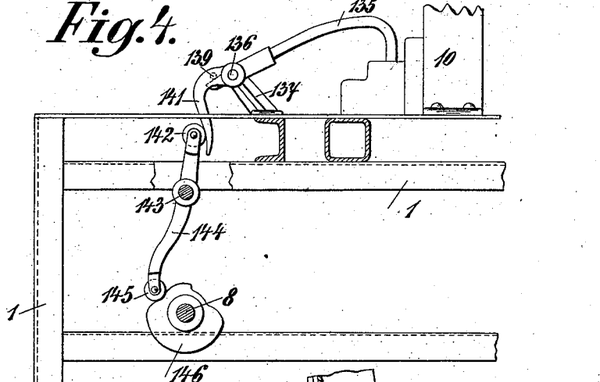
Fig. 4 shows a side elevation of details for holding the matches in the boxes after the filling operation.
Figure 5:
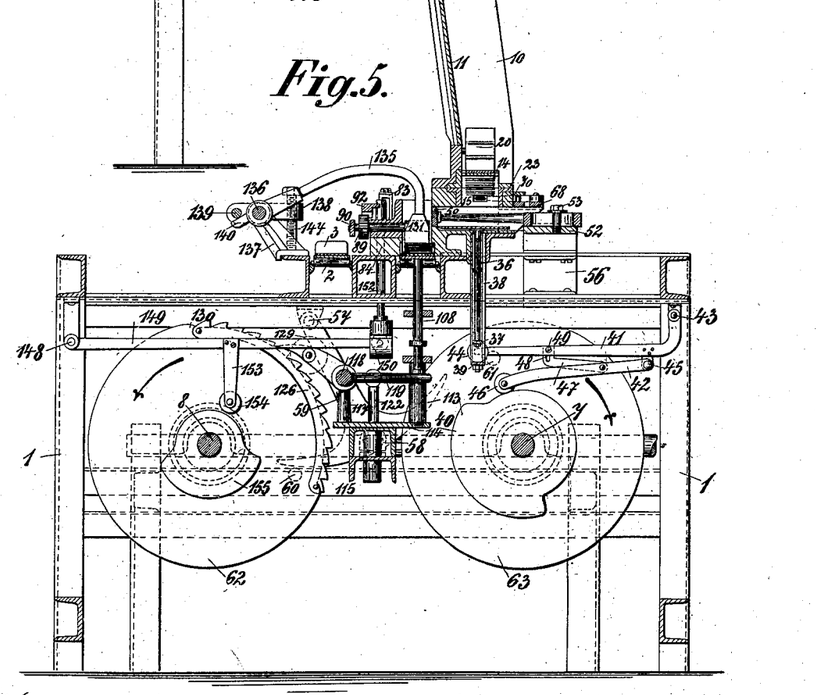
Fig. 5 is a section on the line $a\,b$ of Fig. 1.
Figure 6:
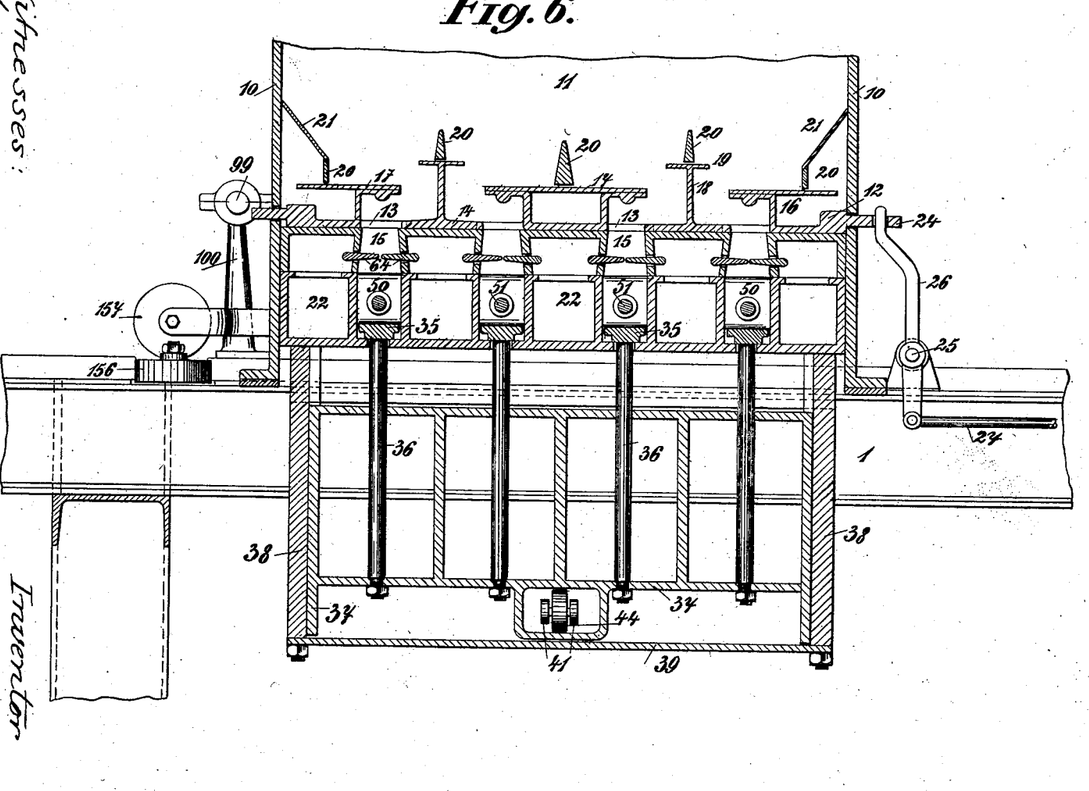
Fig. 6, a section, on enlarged scale, on the line $c\,d$ of Fig. 1.
Figure 8:
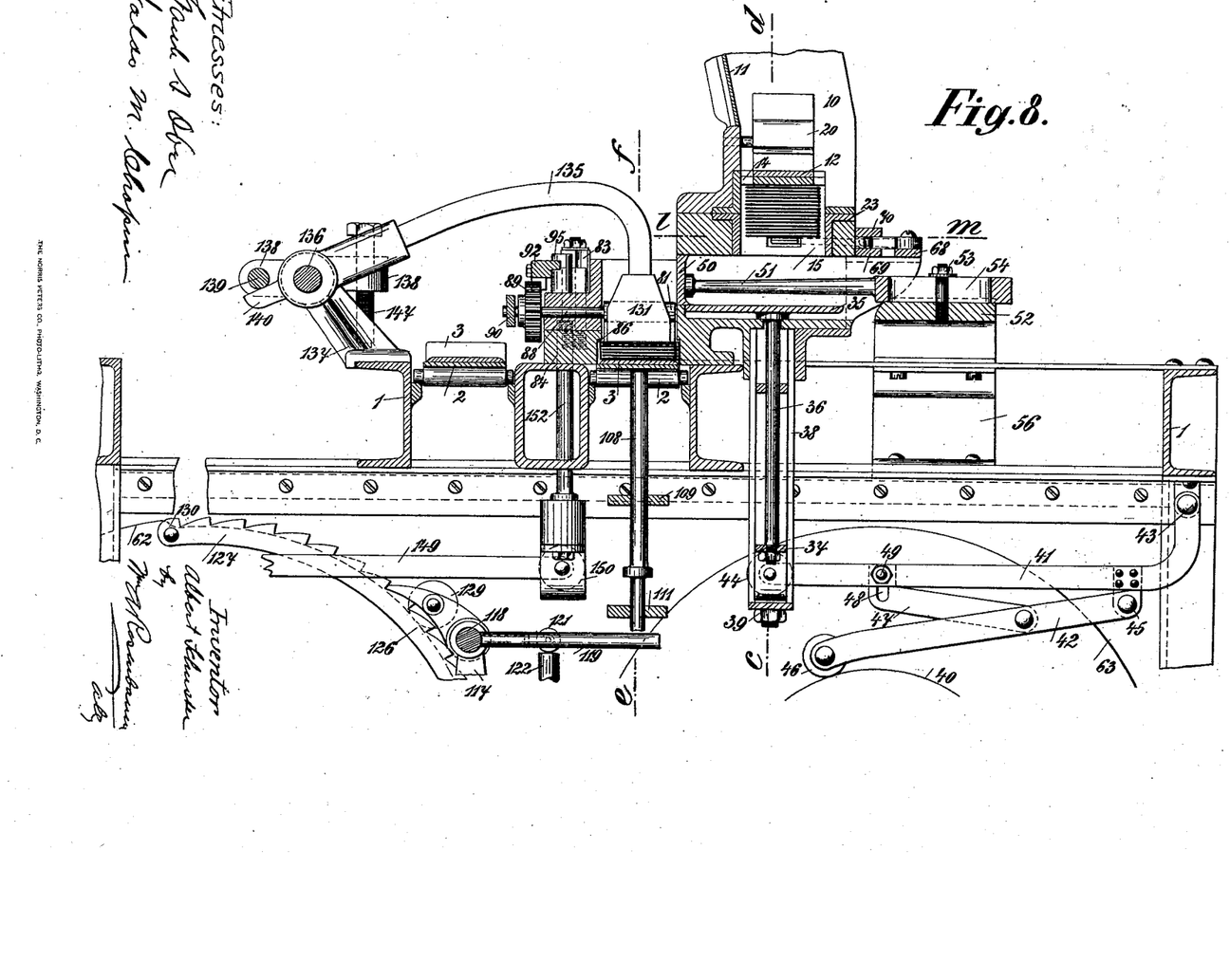
Fig. 8 is an enlarged view, of Fig. 5.
Figure 9:
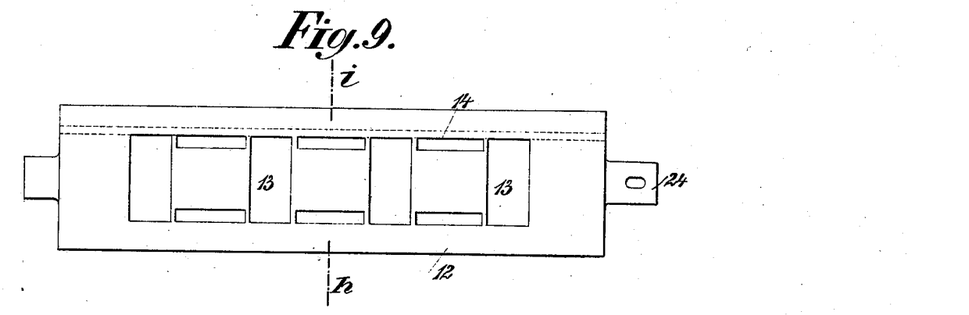
Fig. 9 shows an inverted plan of the vibrating grate.
Figure 10:
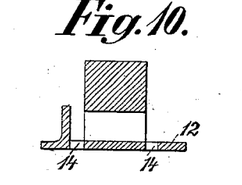
Fig. 10, a section on the line $i\,h$ of Fig. 9.
Figure 11:
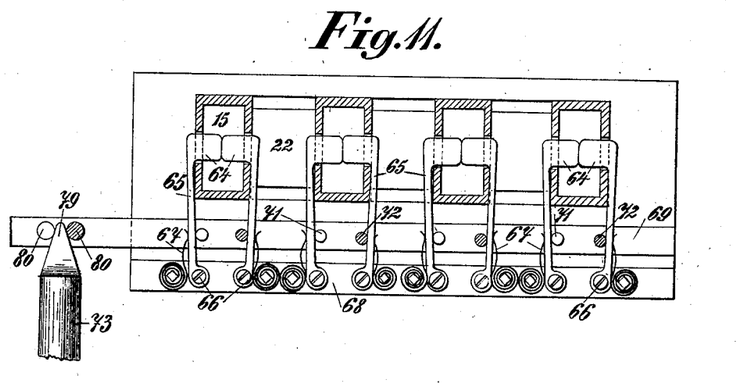
Fig. 11, a section on the line $l\,m$ of Fig. 8.
Figure 12:
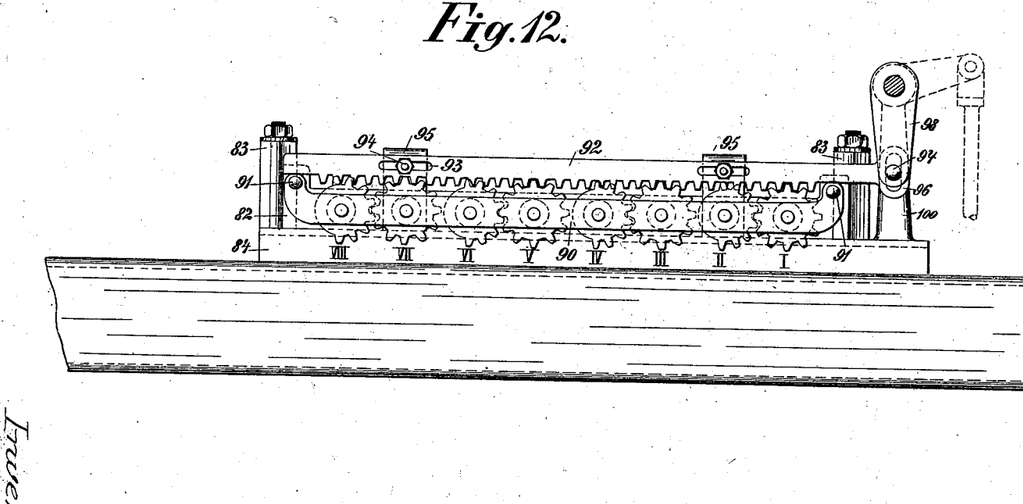
Fig. 12 is an elevation of the device for moving the bipartite doors.

The matches after removal in the usual way from the dipping-receptacle are introduced into the hopper 9, with the tipped ends to the front. As Figs. 2, 3, and 5 of the drawings show, the hopper 9 consists of side cheeks 10, in which the plate 11, forming the back, is fitted to slide. The hopper is closed from beneath by a vibrating grate 12, (illustrated in inverted plan in Fig. 9,) showing the slots 13 and 14, of which the slots 13 allow the longitudinally-disposed matches to pass through into receiving-boxes placed beneath, and the slots 14 serve for separating matches in transverse position on the grate. As Fig. 6 shows, plates 17 are arranged on the upper face of this grate 12 by means of upwardly-projecting angle-irons, and in a higher position ribs 18 carry the plates 19. The plates 17 and 19 slide under projections 20, rigidly fixed to the plate 11. The noses 20 at either side are also connected to the cheeks 10 by inclined sheet-metal plates 21, on which the match-splints slide. This formation of the vibrating plate permits the certain alinement of the matches with the tipped ends forward and uniform feed of these to the receiving-boxes beneath the slots 13. Moreover, the pressure of the piled-up matches is diverted from the matches in the receivers 15, so that the blade effecting the separation in sheets or layers of these matches has no great resistance to meet with. On vibrating the grate transversely-disposed matches cannot enter the receivers 15, but fall through the slots 14 into collectors 22, secured to the ground-plate, so that risk of explosion in filling the boxes or of breakage of matches in the boxes is avoided. The vibration of the plate 12, which rests on the plate 23 and is guided by trunnions 24, bearing in the cheeks 10, is effected as follows: A double-armed lever 26, pivotally secured to the bed 1, projects into an eye of the trunnion 24 and at its lower end engages a bar 27, which projects through an orifice in the plate 2, likewise secured to the bed 1, and on which a helical spring 29 presses, being held in position by a nut 30 at the end of the bar 27. The bar 27 is engaged by the lever 32, pivoted at 31, and oscillated by a ratchet-wheel 33, keyed on the pulley-shaft 34, so that the uninterrupted reciprocating motion is imparted to the bar 27, which motion is conveyed in the same manner to the grate 12.

The surface 23, on which the vibrating grate 12 slides, is the upper face of a casing containing the box-like receivers 15, and the dimensions of these receivers correspond to those of the match-boxes to be filled, the sides of the receivers being inclined to the vertical, so that matches may slide readily therefrom. The sunk plates 35 form the bottom closure of these receivers 15 and are mounted on rods 36, secured to the sliding frame 37. This sliding frame 37 slides in prismatic guides of the outer frame 38, secured to the base of the casing carrying the collectors 22. At the extreme base the two rails 38 are united by a traverse 39, which also serves as a stop for the sliding frame 37. The frame 37 receives its vertical reciprocation from the cam-disk 40 with clockwise rotation by means of the lever arrangement 41 42. The lever is pivotally mounted at one end 43 on the machine-bed and with its opposite end, which carries a roller 44, engages the frame 37. To this lever at 43 is pivotally attached the lever 42, whose forward end is provided with a roller 46, and the position of this lever 42 relative to the lever 41 can be adjusted by the lever 47, having a slot 48 by means of a screw-pin 49 in the lever 41. This lever arrangement permits an exact adjustment of the plate 35 at the height required.

The chambers of rectangular section in which the plates 35 slide serve when the plates 35 are lowered as guides for the piston-like pushers 50. These piston-pushers 50 50, which are in the same number as there are plates 35, are fixed to the forward ends of piston-rods 51, adjustably secured to the surface of a plate 52 by means of bolts 53, passing through slots in the rear ends of the piston-rods. The plate 52 rests on the slide 56, guided transversely of the machine's axis, and which at 57 is engaged by the anchor-like lever 59, oscillating with the pivot-bolt 58. This lever 59 is oscillated on its pivot 58 by the rolling bolts 60 and 61 or the disks 62 and 63 on the shafts 8 and 7, so that the lever 59 reciprocates the slide 56 in its guide. Thereby the pistons 50 are moved over the plates 35, so as to move away the layer of matches thereon to the doors through which they pass to the match-boxes. The division of the matches into layers or sheets from the quantity which has passed from the hopper through the vibrating grate into the receivers 15 and to the plates 35 is effected by blades 64, entering the receivers 15. These blades 64 are the front rectangularly-bent ends of rods 65, which are pivotally connected by the bolts 66 to the upper side of the plate 68 and are pressed toward each other by springs 67.

Two sliding plates 69 and 70, of which the one, 69, is beneath, resting on the plate 68, while the other, 70, lies over the tangs 65 of the blades 64, are provided with pins 71 72, and as soon as the bars 69 70 are moved in opposite directions the pins 71 72 tend to rotate the tangs 65 around the bolts 66.

The operation of the bars 69 and 70 is effected by the tapered end 79 of the rod 73 passing between roller-pins 80 on the plates or bars 69 and 70, and thereby moving them in opposite directions. The rod 73 has a bolt 74, passing through a lever 76, oscillating on the pivot-bolt 75, and which carries at its other end a roller 77, actuated by the cam-disks 78 on the shaft 7. The matches pushed from the plates 35 by the pistons 50 pass to the doors 81, provided in front of the casing in the door-frame. The door-frame consists of the casting 82, guided between the rectangular plugs 83. The plugs 83 are screwed into the body 84. The front edge of the casting 82 registers with the recessed edge 85, which projects somewhat over the inner edge of the channel 86 and covers the ends of the match-box trays introduced into the channel. Parallel cheeks 87 are arranged at the front of the body 82, which separate off spaces in the door-frame corresponding to the spaces of the plates 35. Horizontal shafts 38 project through the body 82, which shafts carry the doors 81, and at the other end are firmly connected to toothed wheels 89.

A bar 90, secured to the casting 82 by bolts 91, serves as a support for the shafts 82. A rack 92 is arranged over the spur-wheels through slots 93, in which rack the bolts 94 pass and which are secured into the body 82, so as to serve as guides for the rack. Further guidance is provided by the plugs 83, secured to the body 82. The one end of the rack 92 has a vertical longitudinal eye 96, engaged by a fork-like lever 98, the roller 97 of which slides on the bolt 99 in the eye 96.

Of the pinion-wheels 89, secured to the bolt 86, only those marked I, III, V, and VII engage with the rack. Those marked II IV VI VIII are of less thickness than the above and are only in part formed as pinion-wheels, so that there is no engagement with the rack. However, the pinions II IV VI VIII engage with the pinions I III V VII and are rotated in opposite direction, so that the longitudinal doors open downward at right angles, or almost so, and close in the same way. The movement of the lever 98, secured on the shaft 99 in the bearing-block 100, is effected through the agency of the lever 101, which is likewise engaged by the upper forked end of the rod 103 in a slot by means of a roller 110 on the bolt 102. The rod 103 is guided in the path 104, secured to the bed, and has a roller 105 at its lower end. A helical spring 106, likewise secured to the path 104, is secured to the lower end of the rod 103 and effects a sudden drawing away of the rod 103 after the roller 105 has compressed the disk 107, and effects thereby a sudden rotation of the shaft 99 and a sudden opening of the doors.

Beneath the four clips 3 of the chain 2, lying under the door-frames, four vertical rammers 108 are guided in two superposed plates 109 111, having suitable orifices and connected by studs 112. The lower plate 111 rests on studs 113, screwed into a block 114 on the bed 115. Tappets 116 on the rammers 108 prevent the latter from passing completely through the plates 111. At the rear end of the block 114 is secured a bearing-block 117, in which is guided a shaft 118. Four horizontal pawls 119 are secured to the shaft 118 to correspond with the rams 108. The shaft 118 also possesses two arms 120, parallel to the pawls, and which carry a roller 121 at their forward end in a cross-bolt. This roller 121 rests on piston-rods 122, guided in sleeves 123, secured to the bed 115. The pistons 122 are reduced at their lower extremities, and round the reduced end is coiled a helical spring 124, pressing against the base 125 of the sleeves 123. The shaft 118 has a knob 126, which comes at times into engagement with the toothed sector 127 on the disk 62, whereby the shaft is caused to oscillate and the pawls 119 allow the rammers 108 to sink according to the oscillation of the shaft. The helical springs 124, as soon as the pawl 126 comes out of engagement, exert a counter-pressure and thrust the pawls 119 and the rammers 108 upward, so that the rammers act against the lower side of the chain and impart a drum-like vibration thereto, so that the boxes held by the hooks on the chain are shaken along with their contents and the matches brought to lie parallel. The knob 126 is brought out of engagement by the roller 129, connected thereto, running over the path 130 of the disk 62. To prevent the matches being ejected from the boxes by the vibration aforesaid, pressure-hammers 131 are provided, consisting of two cheeks 132, united by bolts 133 and fitted with a semicircular base-plate 134. These hammers are at the end of the bent levers 135 provided to the number of four on the shaft 136, running in bearings 137 on the bed 1. At both sides of the shaft 136 arms 138 are provided, united by a rod 139, against the lower edges of which noses 140 of the levers 135 rest. This rod 139 is firmly connected with one bent lever 141, against which acts the roller 142 of a double lever 144, pivoted to the bolt 143. The lever 144 has also a roller at its lower end 145, which is caused to swing out by the cam-disk 146 on the shaft 8. The hammers register with the upper edges of the boxes, and in order to regulate these continuously one arm 138 on the shaft 136 is extended beyond the shaft, and a set-pin 147 is screwed through this extension, projecting against the bearing 137, so as to prevent the hammers 131 entering too far into the boxes.

The lowering and raising of the frame 82 is effected by the lever 149, pivoted to the frame at 148, and which carries at its forward end a roller 150, engaging a frame 151, which, by means of the rods 152, projecting through the frame and the body 84, is connected with the body 82. The lever 142 has a forked lever 153, projecting downward, which carries a roller 154, sliding on the cam-disk 155.

Before passing into the channel 86, beneath the edge 85, the match-box trays are directed by a horizontal roller 156 and two vertical rollers 157. The angle-iron which forms the lateral boundary of the chain is hollowed at the position of the roller 156, so that the latter presses against the rear end of the box. The rollers 157 press against the upper edges of the rear of the boxes, so that boxes are constrained to occupy a position of alinement.

The machine shown in the figures is at the position of the end of a working stroke when four match-box trays are filled with matches. The matches are lying in the trays and the doors still projecting into these are open, the pressure-hammers are lying on the splints registering with the upper edges of the match-boxes. The drum-striking mechanism is in motion, the horizontally-acting pistons are still pushed forward, the knives still closed. On further motion of the machine the pistons first go backward, the support-plates 35 of the matches are raised into the receiving-boxes, the knives open, the door-frame is raised, and then the hammers. The chain passes forward, the rack is brought into operation and actuates the pinion-wheels to close the doors. Meantime the knives have separated off another layer of matches and the plates 35 lowered these. The door-frame now sinks to the same level, the chain stands still after moving forward the space of four links. The piston's progress bring the matches to the doors, which suddenly open downward and engage with the sides of the box to hold them apart, so that all of the matches will surely fall into the box. The hammers sink to the upper edge of the boxes and the drum mechanism below shakes the latter. This process is uninterrupted during the operation of the machine.

The machine described is given as an example which may be varied without departing from my invention. For instance, more than four receiving-boxes may be used and other alterations may be made.

What I claim, and desire to secure by Letters Patent of the United States, is—

1. In a match-box-filling machine, the combination of a hopper for the splints, a vibrating grate across the lower end of the hopper, said grate provided with two sets of elongated openings arranged at right angles to each other, receiving-chambers below one set of openings for misplaced splints, apportioning-chambers and devices below the other set of openings for correctly-placed splints, said grate carrying elevated horizontal plates adapted to relieve the splints in the grate from the pressure of those above, substantially as described.

2. In a match-box-filling machine, the combination of a hopper for the splints, a vibrating grate across the lower end of the hopper, said grate provided with two sets of elongated openings arranged at right angles to each other, receiving-chambers below one set of openings for misplaced splints, apportioning-chambers and devices below the other set of openings for correctly-placed splints, a passage containing a pair of horizontal doors, means for transferring the apportioned splints onto said doors, a box-carrier located below the doors and means for opening the doors to allow the splints to fall into the box, substantially as described.

In testimony whereof I have hereunto set my hand in the presence of two witnesses.

ALBERT SCHUSTER.

Witnesses:
WOLDEMAR HAUPT,
HENRY HASPER.